(12) United States Patent
Wang et al.

(10) Patent No.: US 7,062,507 B2
(45) Date of Patent: Jun. 13, 2006

(54) INDEXING PROFILE FOR EFFICIENT AND SCALABLE XML BASED PUBLISH AND SUBSCRIBE SYSTEM

(75) Inventors: Changzhou Wang, Bellevue, WA (US); Jihad Boulos, Jbeil (LB); Ali Bahrami, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 559 days.

(21) Appl. No.: 10/373,352

(22) Filed: Feb. 24, 2003

(65) Prior Publication Data

US 2004/0167864 A1    Aug. 26, 2004

(51) Int. Cl.
*G06F 17/30*    (2006.01)

(52) U.S. Cl. .................................................. 707/102
(58) Field of Classification Search .................... None
See application file for complete search history.

(56) References Cited

U.S. PATENT DOCUMENTS

| | | | | |
|---|---|---|---|---|
| 2002/0120859 A1* | 8/2002 | Lipkin et al. | ................ | 713/200 |
| 2004/0268244 A1* | 12/2004 | Levanoni et al. | ........... | 715/514 |
| 2005/0038688 A1* | 2/2005 | Collins et al. | ................ | 705/9 |

OTHER PUBLICATIONS

Ashish Dumar Gupat et al., Stream processing of Xpath queries with predicates, Jun. 2003, ACM Press, NY NY, pp. 419-430.*

Mehmet Altinel and Michael J. Franklin, "Efficient filtering of XML documents for selective dissemination of information", in Proceedings of 2000 International Conference on Very Large Data Bases (VLDB), pp. 53-64.

Jianjun Chen; David J. Dewitt, Feng Tian, and Yuan Wang, "NiagaraCQ: A scalable continuous query system for Internet databases," in Proceedings of ACM SIGMOD (Special Interest Group on Management of Data) 2000 Conference.

Francoise Fabret, Hans-Arno Jacobsen, Francois Llirbat, Jo Ao Periera, Kenneth A. Ross, and Dennis Shasha, "Filtering algorithms and implementation for very fast publish/subscribe", in Proceedings of ACM SIGMOD (Special Interest Group on Management of Data) 2001 Conference.

Yanlei Diao, Hao Zhang, Michael J. Franklin and Raymond To. "YFilter: Efficient and scalable filtering of XML documents", in Proceeding of International Conference on Data Engineering (ICDE) Conference, 2002, San Jose, CA, USA.

(Continued)

*Primary Examiner*—Diane D. Mizrahi
(74) *Attorney, Agent, or Firm*—Shimokaji & Associates, P.C.

(57) ABSTRACT

The present invention provides a system and method for the efficient indexing and delivery of information to interested users who have expressed an interest in or "subscribed" to information items that are continuously released or "published" by some data source in XML format. Previously, publish and subscribe systems accepted keyword-based subscription profiles and did not support subscription to XML documents according to their structures. Direct approach to implement XML-based publish and subscribe system by checking each user profile against an XML document is very time consuming. The presentation invention, though, provides an efficient method to identify interested subscribers for each XML document by indexing queries utilizing a graphical structure of nodes. When an XML document is published, the index identifies all matched expressions in the index and delivers at least a portion of an XML document to a user who has expressed an interest in receiving this information.

35 Claims, 14 Drawing Sheets

OTHER PUBLICATIONS

Eric N. Hanson, Chris Carnes, Lan Huang, Mohan Konyala; Lloyd Noronha, Sashi Parthasarathy, J.B. Park, and Albert Vernon. Scalable trigger processing. In ICDO, pp. 266-275, 1999.

Z. Ives, A. Levy, and D. Weld. Efficient evaluation of regular path expressions on streaming XML data. Technical report, University of Washington, 2000.

Tak W. Yan and Hector Garcia-Molina, "Index structures for selective dissemination of information under the Boolean model", in Transactions on Database Systems (TODS), ACM Press, 19 (2): 332-364, 1994.

Tak W. Yan and Hector Garcia-Molina. The SIFT information dissemination system. TODS, 24(4):529-565, 1999.

* cited by examiner

```
   600   Q1   /a
   602   Q2   /a/b
   604   Q3   /a/*/b
   606   Q4   /a//b
   608   Q5   /a/*/b//c/d
   610   Q6   /b//c/d
```

$$\left\{\begin{array}{lll} 612 & Q7 & /a[@x] \\ 614 & Q8 & /a[@x=1] \\ 616 & Q9 & /a[@x=2] \\ 618 & Q10 & /a[@x>3] \\ 620 & Q11 & /a[@x='1'] \\ 622 & Q12 & /a[@Y<=2] \end{array}\right.$$

INDEXING PROFILE FOR EFFICIENT AND SCALABLE XML BASED PUBLISH AND SUBSCRIBE SYSTEM

BACKGROUND OF THE INVENTION

The present invention generally relates to filtering digital information, and, more specifically, to a system and method of efficiently providing interested subscribers with XML documents based on a publish and subscribe system and method.

Information accumulates explosively and, thanks to the advance of computing and communications technologies, much of it is digitized and becomes available through the Internet or intranets. Often, though, there is too much information and the user is overwhelmed.

Traditional search and pull systems, as depicted in FIG. 1, are known within the art. A traditional search and pull system 11 for locating information of interest to a user is shown in FIG. 1. These systems typically have distributed network of computers 10 with information objects contained therein. In order to obtain interesting objects, a user computer 12 first needs to consult a search engine 14 to find the locations of the objects in the distributed network of computers 10, unless the locations are previous determined and saved (or memorized by the user). Once the locations of interesting objects are found, the user computer 12 needs to contact the corresponding computers 10 in the distributed network to retrieve the objects. To find locations using the search engine 14, a user computer 12 may input simple keywords, and the search engine 14 searches objects in the distributed network of computers 10 to find those that contain the simple keywords. This search and pull process may be repeated every time when new objects are needed.

Publish and subscribe systems are designed to ease this problem by disseminating information only to interested users. A publish and subscribe system facilitates an information push paradigm in which users express long-term interest in ("subscribe to") information objects continuously released ("published") by some external agent. The success of a large scale publish and subscribe system relies both on the efficient identification of interested users for each information object and on the prompt delivery of the object to all interested users.

Also known within the art are publish and subscribe systems that typically use simple keyword matching techniques for the identification task. When new information objects come, the system matches each object against the user profile interests to identify interested users, and deliver it to the interested users via, e.g., email. FIG. 2 depicts a typical publish and subscribe system 13, wherein a user specifies interest, or "subscribes", to a publish and subscribe engine, and the publish and subscribe engine delivers, or "publishes", to the user the information that matches his or her interest. Whereas previously, users received information as a result of isolated searches, the publish and subscribe system continuously delivers items that meet certain criteria to the user. These systems 13 also have a distributed network of computers 10 which contain information objects. However, a user computer 12 may specify interest into a publish and subscribe engine 16 which utilizes matching techniques for the identification task. The publish and subscribe engine 16 matches information contained within objects in the distributed network of computers 12 and delivers an object to the user computer 12 if it matches the specified interest. When new information objects come (from the distributed network of computers 10), the system matches them against the user profile (interests) contained in the publish and subscribe engine 16 to identify interested users, and delivers those information objects to interested users via, e.g., email. Traditionally, the match mechanism is based on simple keywords.

However, XML has become popular for information encoding and exchange. XML allows for a rich information format and opens the door to allowing structure-based subscription in addition to traditional keyword-based subscription. The increasing use of XML as an information encoding and exchange standard demands a more sophisticated mechanism that takes structural information of XML documents into account.

Yan et al, "Index structures for selective dissemination of information under the Boolean model", in Transactions on Database Systems (TODS), ACM Press, 19 (2): 332–364, 1994 proposed many indexing mechanisms to support content-based subscription using both the Boolean model (Boolean connection of keywords) and the vector model (as in Information Retrieval). The information objects to publish are plain text documents without any specific structures assumed.

Fabret et al, "Filtering algorithms and implementation for very fast publish/subscribe," in Proceedings of ACM SIG-MOD (Special Interest Group on Management of Data) 2001 Conference, proposed fast algorithms and efficient caching mechanisms to handle millions of subscriptions. The subscription profile consists of conjunctions of (attribute, comparison operator, value) predicates. The information objects to publish are events, where each event is a conjunction of (attribute, value) pairs.

However, none of the prior art has considered the complex structure within the information objects, such as the element hierarchy in XML documents. Jianjun Chen, et al. "NiagaraCQ: A scalable continuous query system for Internet databases," in Proceedings of ACM SIGMOD (Special Interest Group on Management of Data) 2000 Conference, introduced the XML-based continuous query system, NiagaraCQ. Queries are posted using the XML-QL language. Their goal is to identify common predicate signatures in order to minimize redundant query evaluation processes. However, common element hierarchical structures are not exploited.

Altinel and Franklin, "Efficient filtering of XML documents for selective dissemination of information" in Proceedings of 2000 International Conference on Very Large Data Bases (VLDB), pages 53–64, modeled each XPath expression as a finite state automaton and focused on processing many automata simultaneously. However, no attempt was made to eliminate redundant processing of common XPath components.

Diao et al, "YFilter: Efficient and scalable filtering of XML documents", in Proceeding of International Conference on Data Engineering (ICDE) Conference, 2002, San Jose, Calif., USA, disclosed modeling all the XPath expressions in a single non-deterministic finite automaton. However, it does not consider XPath expressions with predicates, including Boolean connection and nested paths.

As can be seen, there is a need for a publish and subscribe system that is efficient, utilizes hierarchical structures, is capable of eliminating redundant processing, and can match any incoming XML documents against a huge set of profiles quickly.

SUMMARY OF THE INVENTION

The present invention provides a system and method for efficiently providing interested subscribers with XML documents based on a publish and subscribe system.

According to one aspect of the present invention, a method of delivering digital information in XML format to a user is disclosed. A user may subscribe to certain information objects using a profile. Each profile comprises an XPath query on XML documents and a unique ID. User profiles may be stored in a profile and user manager. A user may have multiple subscription profiles. At least one XML document may be inserted from a data source into an XML parser. A data structure may be determined to index at least one query, wherein each query is indexed by a set of nodes and edges in the graph, including a root node and an end node marked with the ID of the profile. The queries may be indexed according to said data structure. The XML document may be parsed such as to provide one parsed XML object. The parsed XML object may be matched to none, one, or multiple end nodes in the directed graph. The corresponding profile IDs marked on the matched end nodes may be delivered to the profile and user manager, the user who corresponds to the unique ID may be notified, and the XML document delivered or published to the user.

In still another aspect of the present invention, a method of quickly delivering digital information in XML format to a user is disclosed comprising inputting at least one profile by the user into a profile and user manager; assigning a unique ID to the user profile which corresponds to at least one user; inserting at least one XML document from a data source into an XML parser; providing a matcher to receive at least one event from the XML parser and to deliver the matched profile IDs to the profile and user manager; determining a data structure to index at least one profile, wherein the index includes one root node and one end node, and possible other intermediate nodes for each profile; indexing at least one profile according to the data structure; parsing at least one XML document such as to provide one parsed XML object; matching at least one parsed XML object to end nodes contained within the data structure to provide a set of matched profile IDs; delivering a set of matched profile IDs to the profile and user manager; notifying at least one user who corresponds to the matched ID; delivering the XML document to all users who correspond to matched IDs; removing any duplicate matched paths; deleting the query from the index structure; and using hash tables to accelerate the matching process.

In yet another aspect of the present invention, a method of quickly delivering digital information in XML format to a user is disclosed, comprising the following steps: inputting at least one profile by a user into a profile and user manager; inserting at least one XML document from a data source into an XML parser, which acts as a start event; initializing an auxiliary stack initially comprised of one stack item, wherein each stack item records a match state comprised of one XML element and at least one node in the index structure; triggering a start element event and assigning a unique ID for each element; checking all out-edges of all nodes recorded in the top item of the stack to find those nodes pointed by the out-edges that matches the element name or an attribute of the start event; pushing matched nodes with the triggering element to auxiliary stack with their unique IDs; collecting marked profile IDs on end nodes once they are pushed to the stack; receiving an end event and, in response, locating at least a portion of the XML document based upon the matched paths; and delivering at least a portion of the XML document to at least one user.

An XML based publish-subscribe system is also disclosed, comprising: at least one data source, wherein the at least one data source inputs at least one new XML document into an XML parser; an index, wherein the index is comprised of at least one query, a matcher, a locator, and a profile parser; a profile and user manager, wherein the profile and user manager accepts profile information from at least one user, utilizes the profile parser to parse it into internal representation suitable for the index, receives matched profile IDs from the matcher corresponding to at least one new XML document, and publishes the document or part of it to the users according to the matched IDs. The profile and user manager also utilizes the locator to locate indexed profiles for deletion.

According to yet another embodiment, an XML based publish and subscribe system for delivering XML documents is disclosed, comprising: at least one data source, wherein the at least one data source inputs at least one new XML document into an XML parser; an index, wherein the index is comprised of one root node and at least one end node for at least one query and maybe many other nodes, at least one in-edge for each node except the root node, at least one out-edge for each node except end node, a symbol labeled with an edge, a matcher, a locator, and an profile parser; a hash table; a profile and user manager, wherein the profile and user manager accepts profile information from at least one user, utilizes the profile parser to parse profiles into internal representations, utilizes the locator to delete any indexed profile, receives matched profiles from the matcher corresponding to at least one new XML document, identifies users whose profiles are matched, and publishes at least one object to these users, wherein the object may be at least one new XML document or part of it.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

It is envisioned that the present invention may be utilized in any computing environment where there is a great deal of information that may be quickly changing, and it is desirable that this information be capable of quick updating and dissemination. By way of example, flight schedules may be well suited for a system such as that disclosed herein. There are many constantly changing variables that may be contained within XML documents. For example, it may be necessary to know which connecting flights are not on time, or weather conditions that may preclude traveling over certain areas. It would be useful to provide a system and method for disseminating the updated information quickly, and delivering that information to interested parties. As opposed to traditional publish and subscribe systems, the present invention indexes profiles, wherein these profiles may be utilized to search and locate any matching XML document. This provides quicker and more efficient delivery of documents to users.

Figure 1:
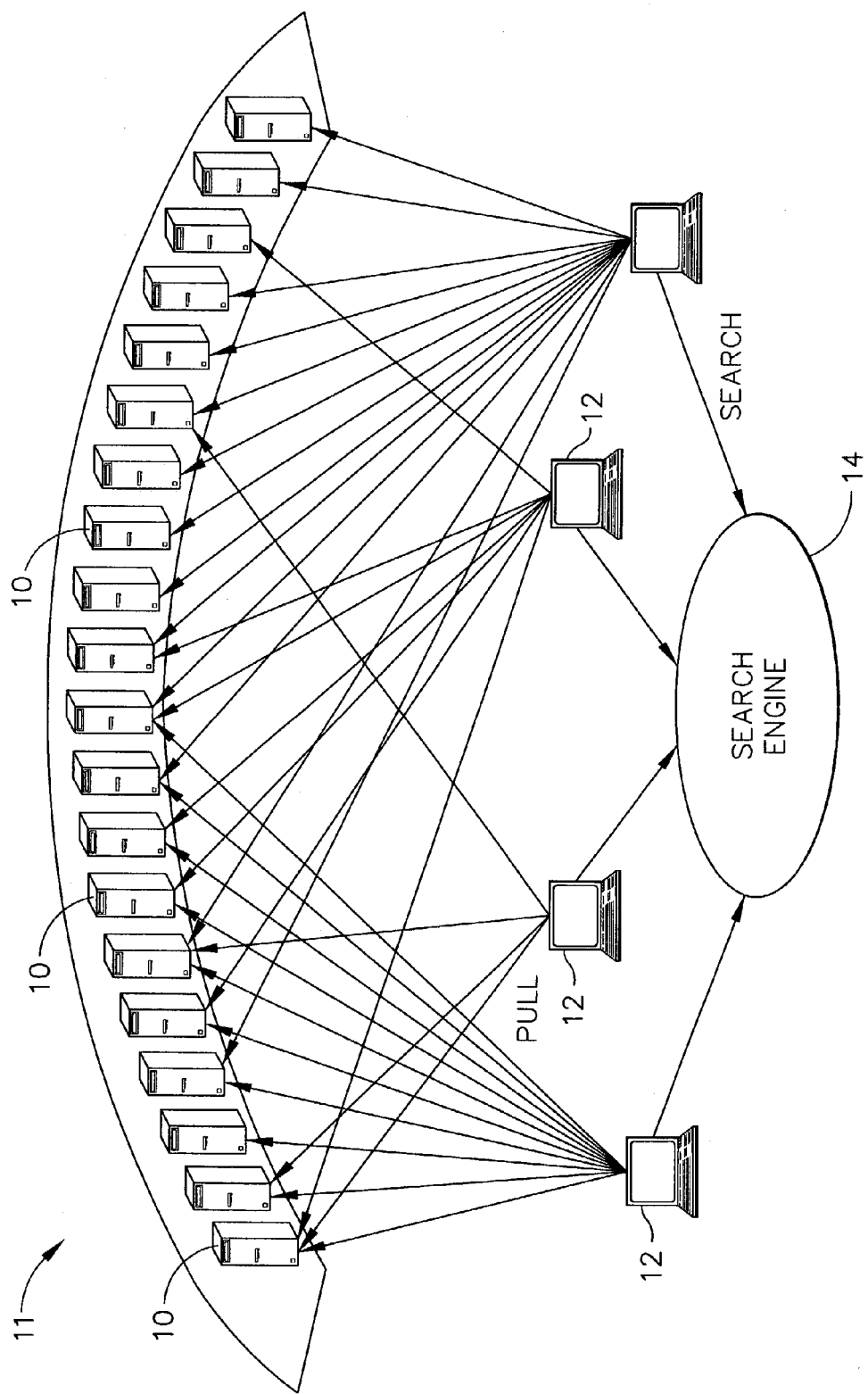
FIG. 1 depicts a system schematic according to the prior art.
Figure 2:
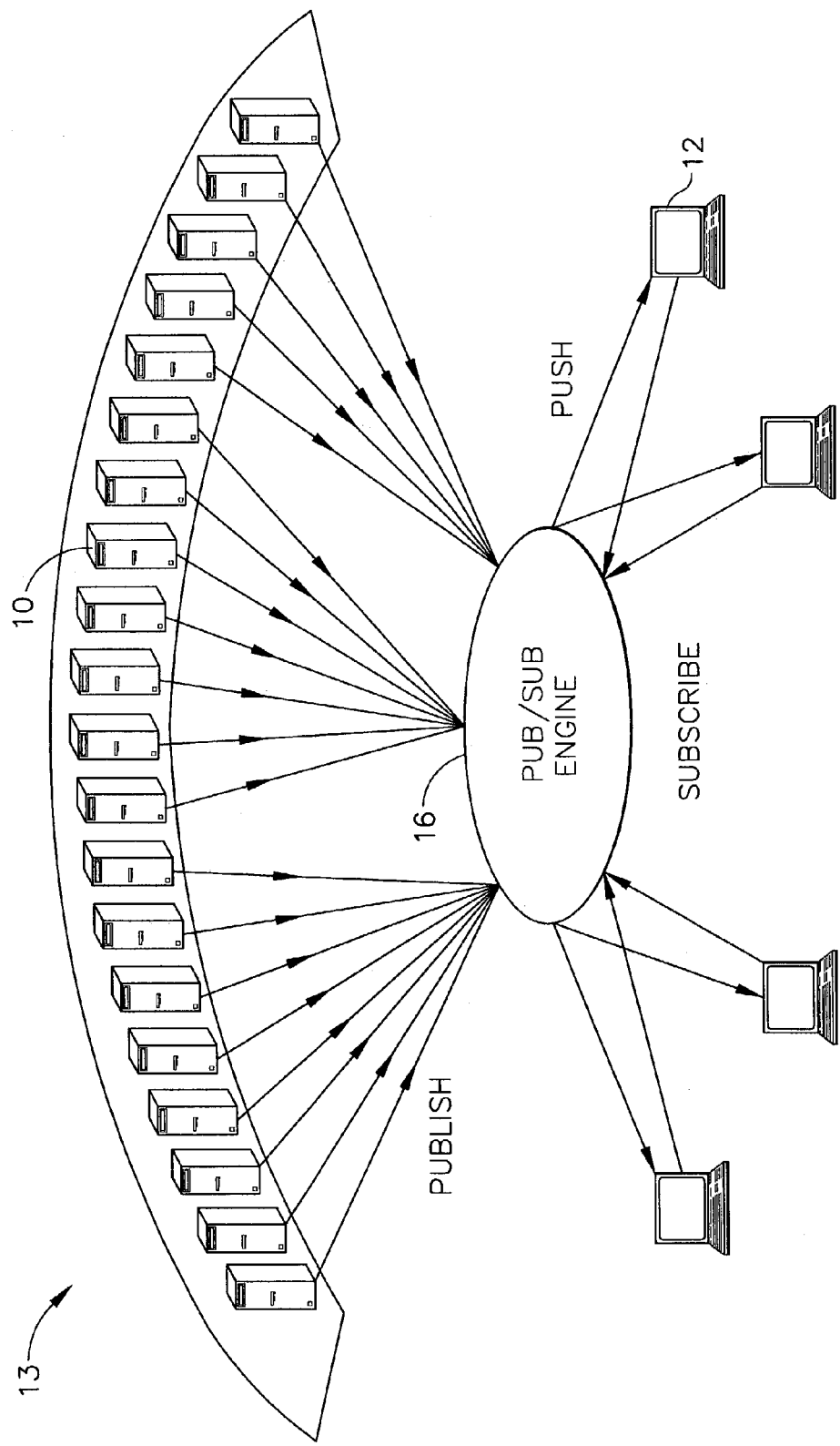
FIG. 2 depicts another system schematic according to the prior art.
Figure 3:
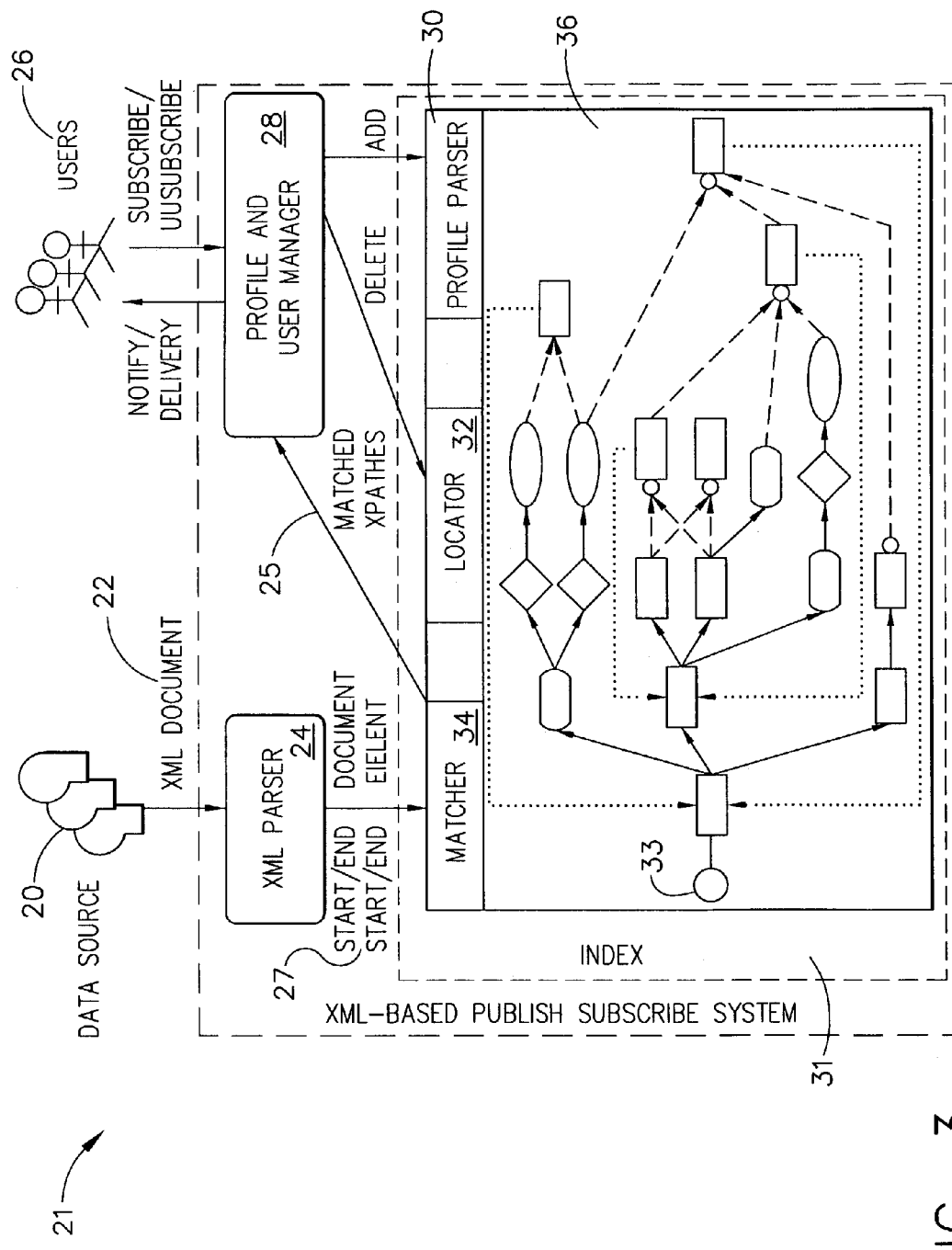
FIG. 3 depicts a system schematic according to the present invention.

FIG. 3 depicts an efficient and scalable XML-based publish and subscribe system 21 as in the present invention. As depicted, there may be a data source 20. The data source 20 may input an XML document 22 into the XML parser 24. At least one user 26 may subscribe to the system 21 and may unsubscribe at any point after subscribing. A profile and user manager 28 may accept profile information from the user 26 regarding items that the user 26 may have an interest in, or would like to have delivered to the user 26. The profile and user manager 28 may also accept information regarding matched profiles from the matcher 34 that correspond to at least one new XML document 22. For each subscription (not shown), a unique ID (not shown) is assigned to the profile (not shown), and the XPath query (not shown) specified in the profile is added to data structure 36. This unique ID is used later to remove the profile from the data structure 36 when the subscription is withdrawn. The profile parser 30 is utilized to analyze the XPath query in the profile and encode it into efficient internal representation for the index structure. It is not the intention of the present invention to provide a method of determining XML items of interest or relevance for an individual user, but rather a method of maintaining a large amount of user profiles so that they may be quickly and efficiently searched, updated, and matched against individual XML documents for publish and delivery. The profile and user manager 28 accepts information from the matcher 34, and at least one user 26 notifies the user 26 and delivers at least one XML document 22 to the user 26. It should be understood that there may also be no matched profile, meaning that there are no items of interest or relevance, in which case, no items are published or delivered.

Figures 4A, 4B:
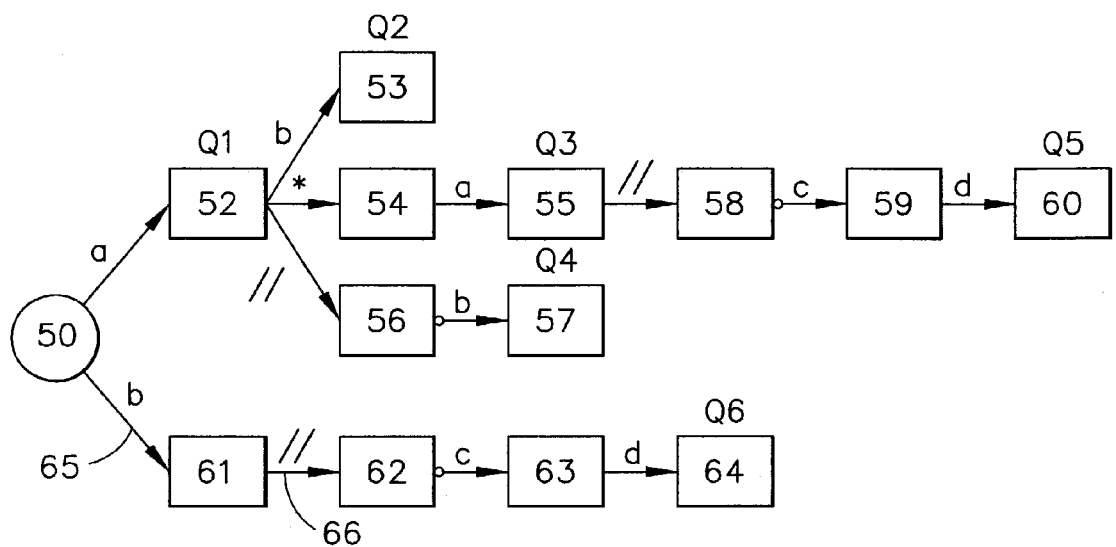
FIG. 4A depicts a system schematic of the index structure according to the present invention.
FIG. 4B depicts the queries indexed in FIG. 4A.

The data structure 36 may operate in a number of different manners and take many different forms depending on the XPath queries in the user profiles. FIG. 4A depicts an index with six queries Q1, Q2, Q3, Q4, Q5, Q6 that consist of a number of nodes, including one root node 50, one end node 52, 53, 55, 57, 60, 64 for each query, and many intermediate nodes 54, 56, 58, 59, 61, 62, 63. Nodes provide information about the parsed XPath queries. This information may include the location of a portion of an XML document and the identification of profiles. Each node may also have edges, for example an in-edge and an out-edge. By way of example, node 61 has an in-edge 65 and an out-edge 66. In general, the only node without an in-edge is the root node 50 and nodes without out-edges may be end nodes (e.g., 53, 60, 57, 64). Edges are labeled with different symbols. Depending on the symbols on their in-edges, nodes can be categorized into different types. There may be element nodes, as depicted by rectangles 52, 53, 54, 55, 57, 59, 60, 61, 63, and 64 and descendant nodes depicted by rectangles with a, small circle on the right 56, 58, and 62. The in-edge of an element node is labeled with an element name, and the in-edge of a descendant node is labeled with a double slash (//) symbol. Different queries may share nodes. Queries sharing the same end node are equivalent. The XPath query string or profile ID may be recorded at the end node. By way of example, Q1 (600), Q2 (602), Q3 (604), Q4 (606), Q5 (608), Q6 (610) are ID's and their corresponding query string is depicted in the table of FIG. 4B.

As shown in FIG. 4B, Q1 (600) represents query string /a. Q2 (602) represents the query string /a/b. Q3 (604) represents query string /a/*/b. Q4 (606) represents query string /a//b. Q5 (608) represents query string /a/*/b//c/d. Q6 (610) represents query string /b//c/d.

Figures 5A, 5B:
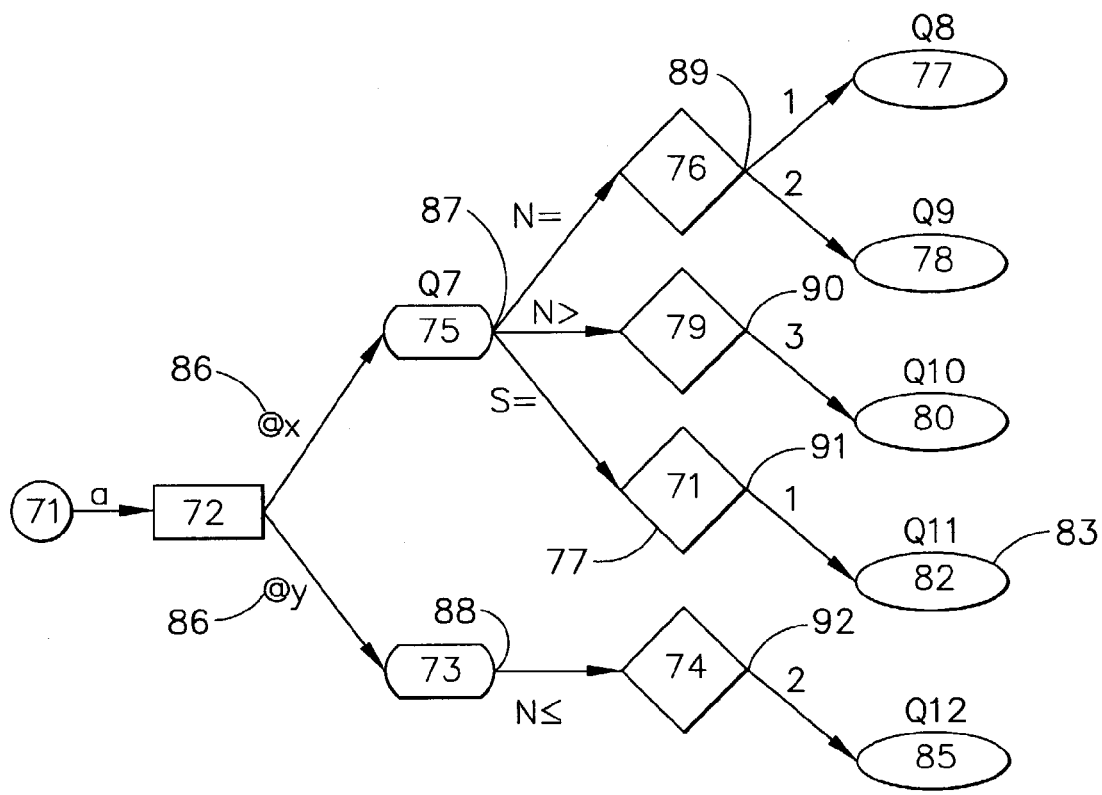
FIG. 5A depicts another system schematic of the index structure according to the present invention.
FIG. 5B depicts the queries indexed in FIG. 5A.

FIG. 5A depicts an index that utilizes additional node types to represent attributes and simple comparison operations on attributes. For each attribute 86 @x (including @*) of an element e in a query, we use an attribute node 75, 73 and an attribute edge 86 (wildcast attribute edge for @*) from the element node 72 for a to the attribute node. For each comparison of an attribute 73, 75, there is an operator node (76, 79, 71, 74) and a value node (77, 78, 80, 82, and 85), with an operator edge 87, 88 from the corresponding attribute node 75 and 73 to the operator node (76, 79, 71, 74) marked with the comparison operator, and a value edge (89, 90, 91, 92) from the operator node (76, 79, 71, 74) to the value node (77, 78, 80, 82, and 85) marked with the constant value (string or number). When a query (such as Q7 (612)) ends with a simple test of an attribute, it is recorded in the corresponding attribute node 75. Otherwise, it is recorded in the corresponding value node (77, 78, 80, 82 and 85) (e.g. Q8 (614)).

In FIG. 5B, Q7 (612) represents the Boolean query /a[@x]. Q8 (626) represents the Boolean query /a[@x=1]. Q9 (616) represents the Boolean query /a[@x=2]. Q10 (418) represents the Boolean query /a[@x>3]. Q11 (620) represents the Boolean query /a[@x='1']. Q12 (422) represents the Boolean query /a[@y<=2]. Each of these queries represents a map of the nodes.

Figures 6A, 6B:
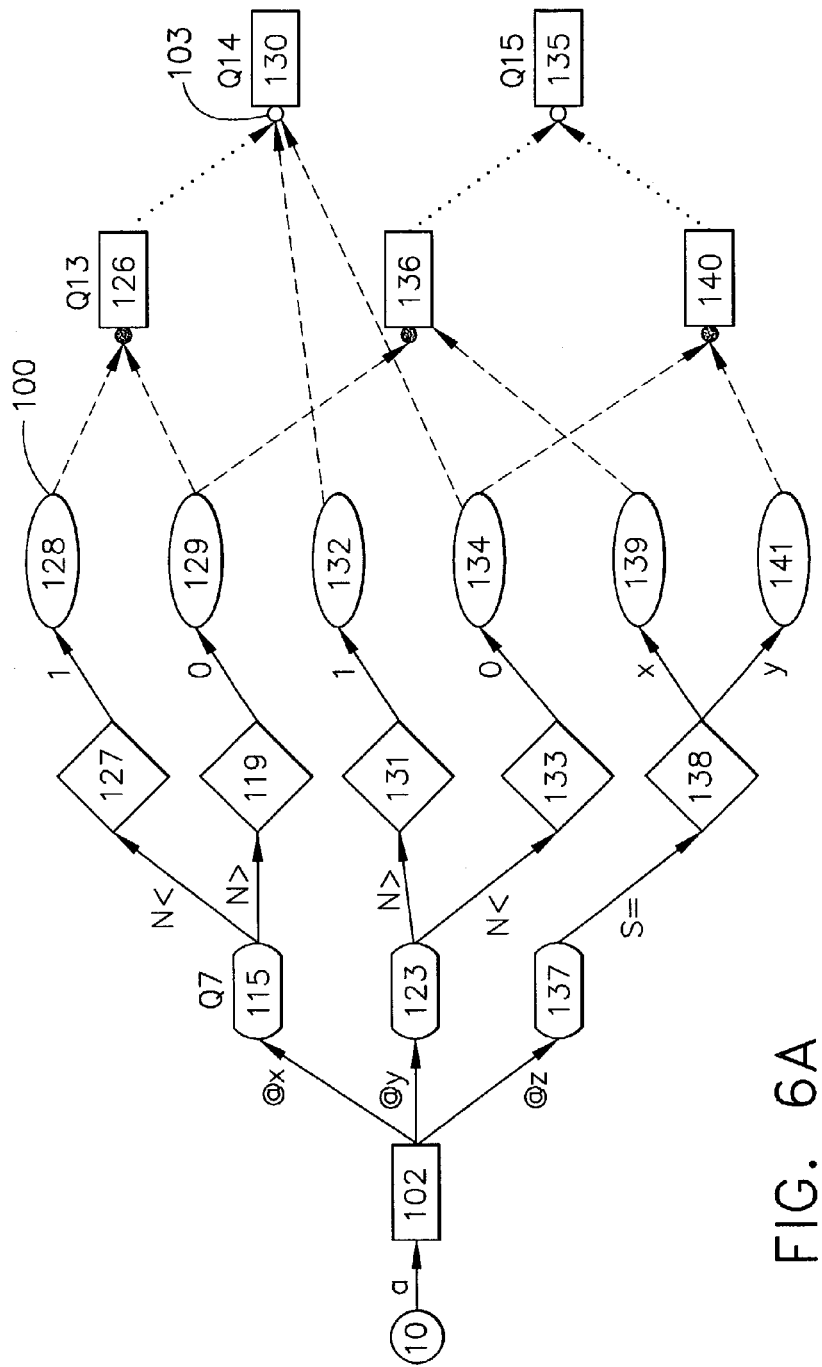
FIG. 6A depicts a further system schematic of the index structure according to the present invention.
FIG. 6B depicts the queries indexed in FIG. 6A.

FIG. 6A depicts an index that utilizes Boolean connections. As shown, a multivariate Boolean "AND" operator is represented by a conjunctive node 126, 136, 140. Each conjunctive node (126, 136, 140) connected by this operator has an ε-edge depicted by dash line 100 leading to the conjunctive node (for example, 126). A multivariate Boolean "OR" operator is represented by a disjunctive node 130, 135. Each node, for example, 129, 132 connected by this operator, has an ε-edge depicted by dash line 103 leading to the disjunctive node 130, 135. Conjunctive nodes 126, 136, 140 and disjunctive nodes 130, 135 are collectively called Boolean nodes. The ε-edges indicate instant transition for the matcher and require no label. When Boolean nodes exist, the index structure is no longer a tree, but rather a directed acyclic graph (DAG).

As shown, in FIG. 6B, Q13 (624) represents the Boolean query /a[@x<1 and @x>0]. Q14 (626) represents the Boolean query /a[@x>1 and @x>0 or @y>1 or y<0]. Ql5 (628)

represents the Boolean query /a[@z='x' and @x>0 or @z='y' and @y=0]. Each of these queries represents a map of the nodes.

Figures 7A, 7B:
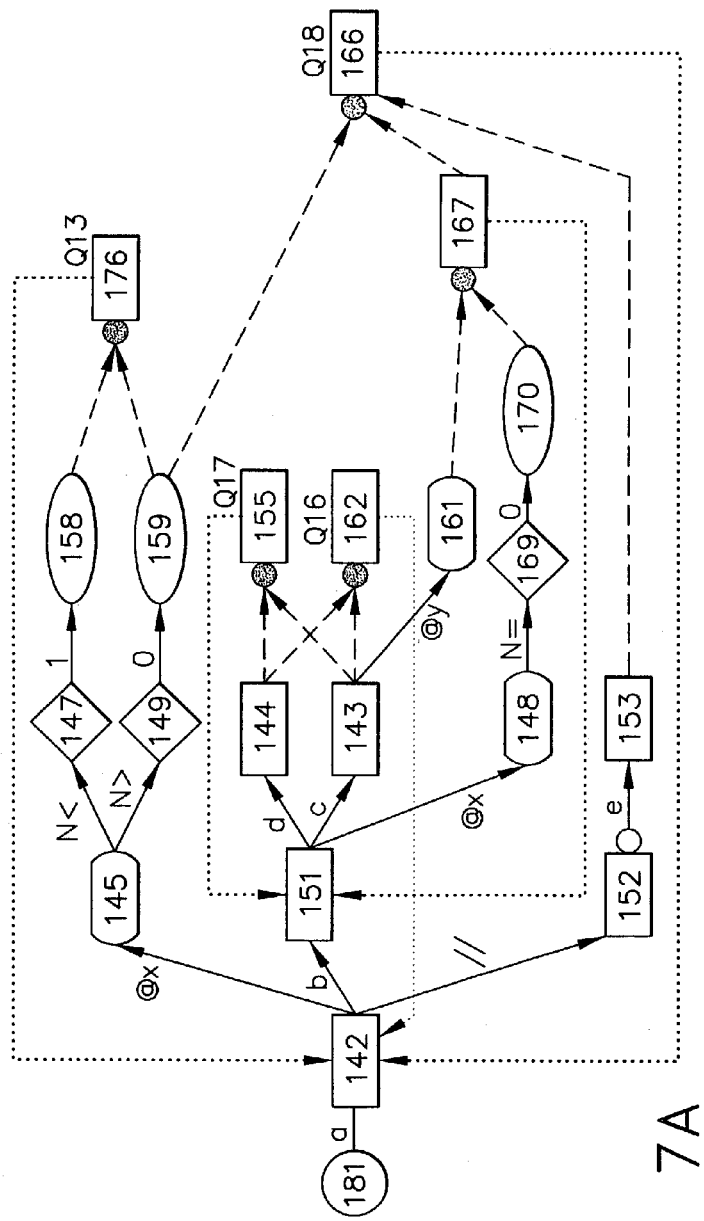
FIG. 7A depicts yet another system schematic of the index structure according to the present invention.
FIG. 7B depicts the queries indexed in FIG. 7A.

Queries according to the present invention may also include nested paths, as depicted in FIGS. 7A and 7B. A nested path is an XPath specified in a predicate for an element. By way of example, a predicate could be c in /a/b[c]/d. In this example, both the main path (/a/b/d) and the nested paths (/a/b/c) need to be matched to part of the incoming XML object in order to provide a matched object (not shown) to a user 26. However, a simple conjunction of the main path and the nested path is not equivalent to the complex path. Therefore, nested paths may be required. By way of example, Q16 (630) shows an instance of element c must be a child element of an instance of element b. Element b is in turn a child element of the root element a. Also, an instance of element c must be a child element of an instance of element b, which is in turn a child element of the root element a. The two instances of element b can be the same or not. On the other hand, =to match Q17 (632), an instance of element c must be a child element of an instance of element b, element b must be a child element of the root element a, and the two instances of element b must be the same one. For example, an XML document 22 <a><b><c/></d/></b></a> will match both paths Q16 (630) and Q17 (632), but <a><b><c/></b><b><d/></b></a> will match Q16 (630) only. When evaluating the conjunction of the main path (/a/b/d) and the nested path (/a/b/c), the context elements (a for Q16 (630) and b for Q17 (632)) need to be consulted. The conjunction is only satisfied if all subexpressions are evaluated true under the same instance of the context element. In FIG. 7A, each conjunction node has a link pointing back to its context element, and the link is depicted by dotted lines.

Now, referring back to FIG. 3, the match operation, or matcher 34, may be driven by a SAX (Simple API for XML)-based XML parser. The XML parser 24 may generate a stream of events for each XML document 22. The following may be representative types of events 27 according to a preferred embodiment of the present invention: startDocument, startElement, and endElement. An auxiliary stack structure may be initialized with the root node 33 upon receiving a start event 27 (e.g. startDocument) from the XML parser 24. In general, each stack item may record a match state. The match state may be a set of working nodes and an element instance which causes the transition of the match state. Upon receiving a start element event 27 (e.g. startElement), a unique ID (may be an increasing serial number) may be first assigned for the element instance. For each working node (in the top item of the stack), all of its out-edges are checked to find those that match the tag name and/or attributes associated with the start element event 27 (e.g. startElement). All the matched nodes are collected and pushed to the stack together with the current element instance ID. In addition, all queries recorded in all the matched nodes are stored or reported immediately. Upon receiving an end event 27 (e.g. endElement), the stack simply delivers its top item. Once an element node is matched, its associated attribute nodes, operator nodes, and value nodes are handled immediately (before the next event 27 comes). Boolean nodes with in-edges from them (including the element node) may also be processed immediately. Specially, a conjunctive node is deemed matched only if all its input nodes are matched within the same context. This condition may be checked by maintaining a hash table for each conjunctive node. The hash table maps each instance ID of its context element to a bitmap. The bitmap may record all the matched input nodes within that element instance. When all bits in the bitmap are set, the conjunctive node is deemed matched in the corresponding context node. Descendent nodes are handled specially. For each matched descendent node, it may be first processed as if it is an element node. Then it may be repeatedly added to the next set of working nodes to implement the "descendent" semantics. Meantime, all element nodes with an in-edge from this descendent node are also checked immediately to implement the "self" semantics.

Symbols may be along the edges and compiled into internal representation to reduce storage and computation costs. There are many optimization strategies that may also be utilized and are envisioned according to the present invention. By way of example, a B-tree-like structure may be used to organize value nodes coming from the same operator node, in order to support quick access to both individual value nodes (point search) or a subset of value nodes for values within a range (range search). Reverse links may be utilized to support efficient deletion of queries and optimization of the data structure. Also, hash tables may be utilized to map queries to their end nodes and may also be utilized to map maintenance and math processes of the index.

Figure 8A:
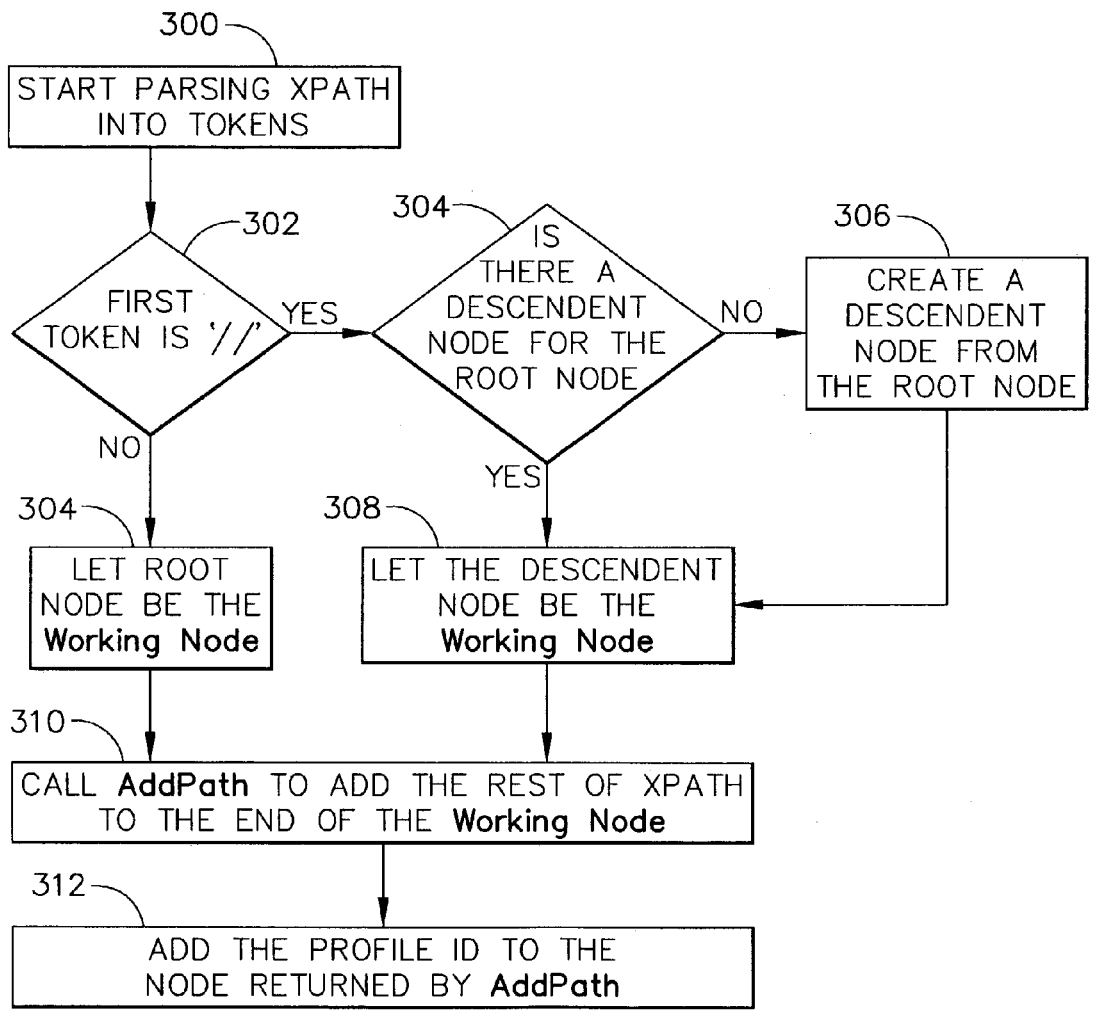
FIGS. 8A, 8B, 8C, 8D and 8E depict flowcharts for indexing profiles according to one embodiment of the present invention.

FIG. 8A depicts a manner to index profiles. It should be noted that the index starts with only the root node. Additional nodes are added or deleted when profiles are inserted or deleted. It should also be understood that the index may be searched to find all profiles that match any given XML document. A first step 300 is to start parsing the XPath query in the profiles into tokens. If the first token is '//' 302, the root node is checked to see whether it has a descendent node 304. If not, a descendent node is created 306. The descendent node is then set to be the working node 308. If the first token is not '//', let the root node be the working node 304. Then the procedure AddPath is called to add the rest of the XPath to the end of the working node 310. In the last step 312, the profile ID is added to the node returned by the AddPath procedure.

Figure 8B:
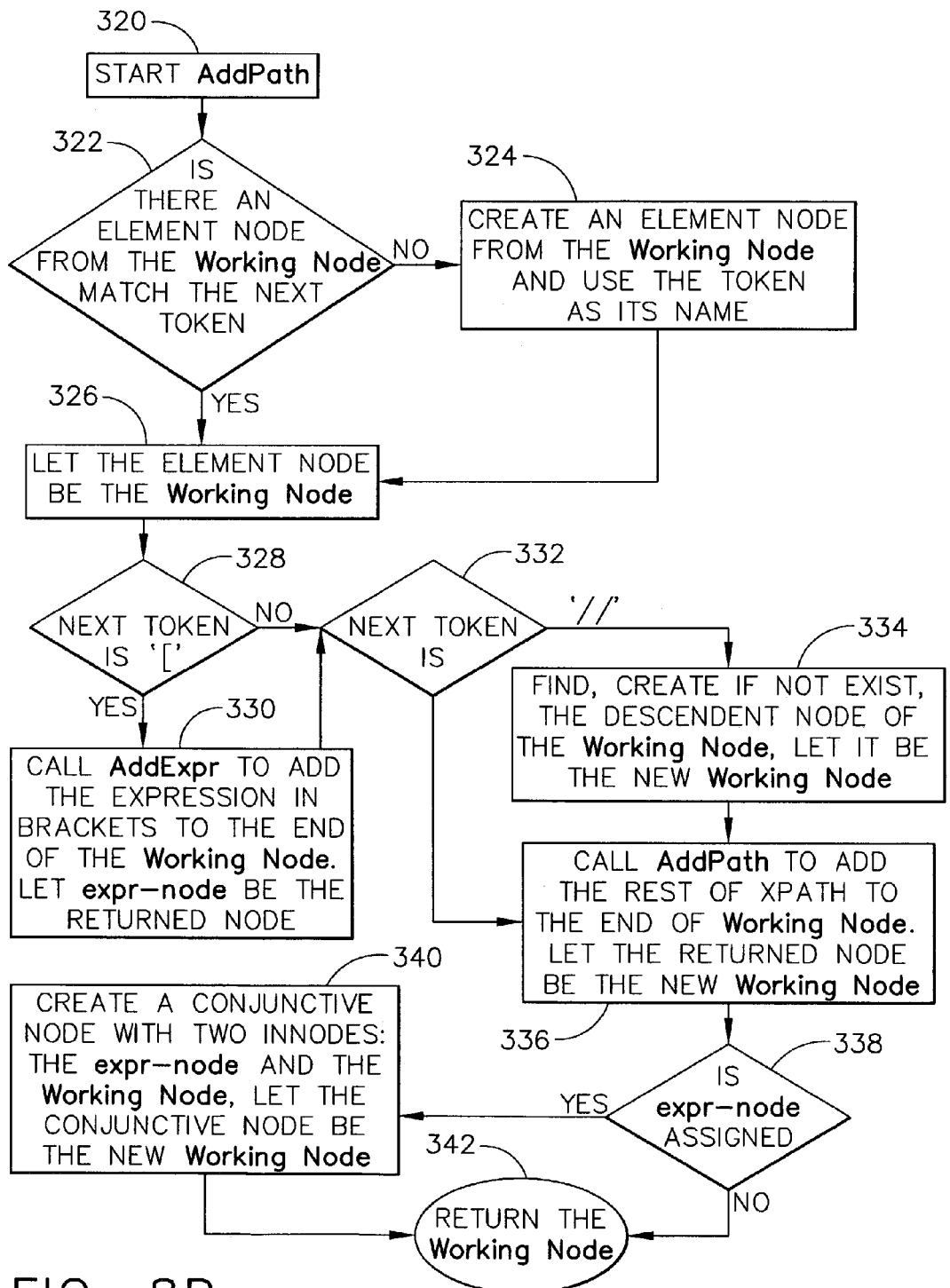

FIG. 8B depicts the AddPath Procedure. Once the procedure is started 320, check whether there is an element node from the working node such that the element name matches the next token 322. If not, create an element node with the name 324. Then let the element node be the new working node 326. Next, test whether the next token is '[' 328. If so, call procedure AddExpr to add the expression in the square brackets to the end of the working node, and record the node returned by AddExpr into expr-node 330. Next, test whether the next token is '//' or '/' 332. If the token is '//', find the descendent node of the working node (create the descendent node first if it does not exist), let it be the new working node 334, and go to step 336. If the token is '/', go directly to step 336. In step 336, call AddPath recursively to add the rest of the XPath to the end of the working node, and let the returned node be the new working node. If expr-node is never assigned (i.e., AddExpr is not called) 338, return the working node 342. Otherwise, create a conjunctive node with the working node and the expr-node as its two in-nodes, and let the conjunctive node be the new working node 340. Then return the new working node 342.

Figure 8C:
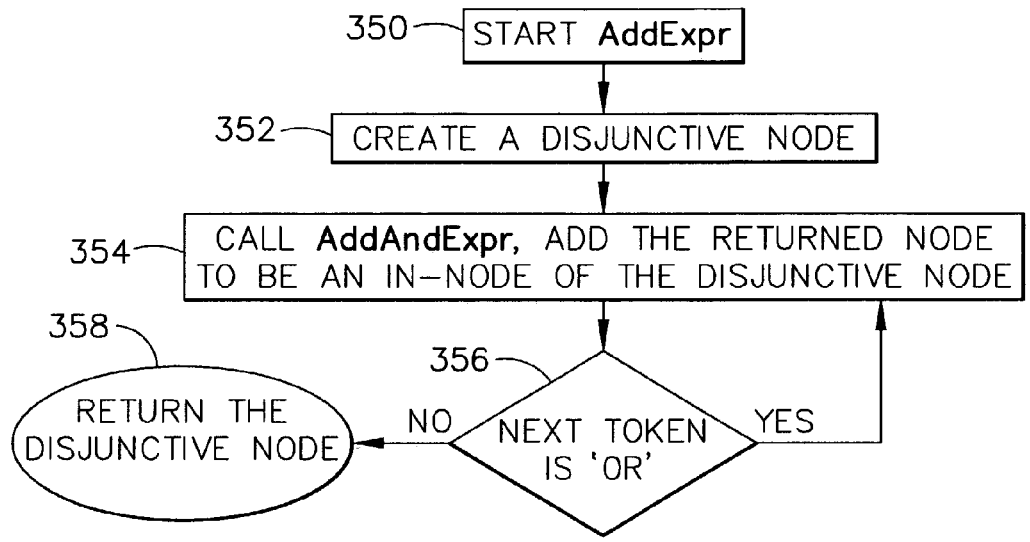

FIG. 8C depicts the procedure AddExpr. Once the procedure is started 350, a disjunctive node is first created 352. Then the procedure AddAndExpr is called and the node returned by the procedure is added to be an in-node of the disjunctive node 354. The next token is checked 356. If it is not 'or', return the disjunctive node 358. Otherwise, go to step 354.

Figure 8D:
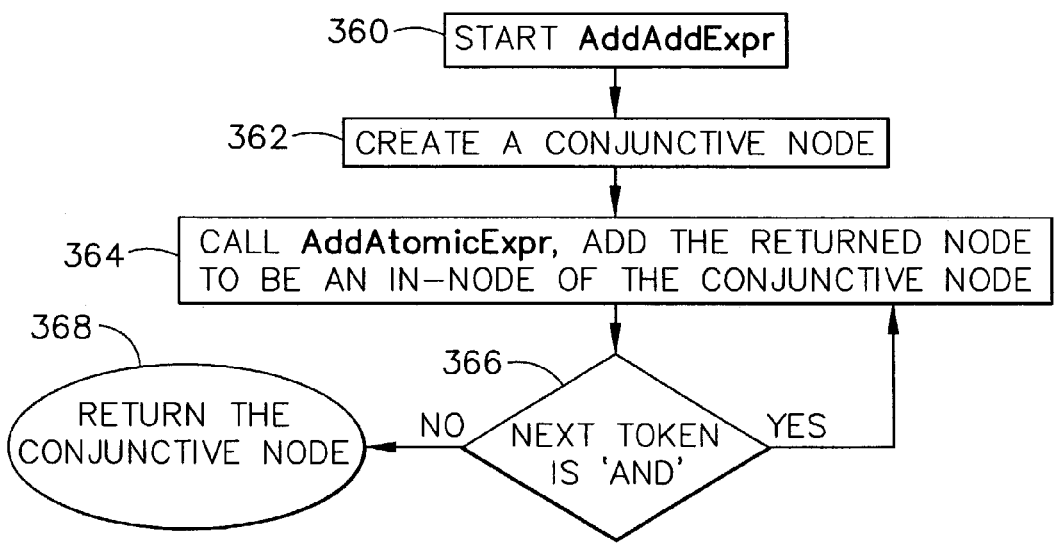

FIG. 8D depicts the procedure AddAndExpr. Once the procedure is started 360, a conjunctive node is first created 362. Then the procedure AddAtomicExpr is called and the node returned by the procedure is added to be an in-node of the conjunctive node 364. The next token is checked 366. If it is not 'and', return the conjunctive node 368. Otherwise, go to step 364.

Figure 8E:
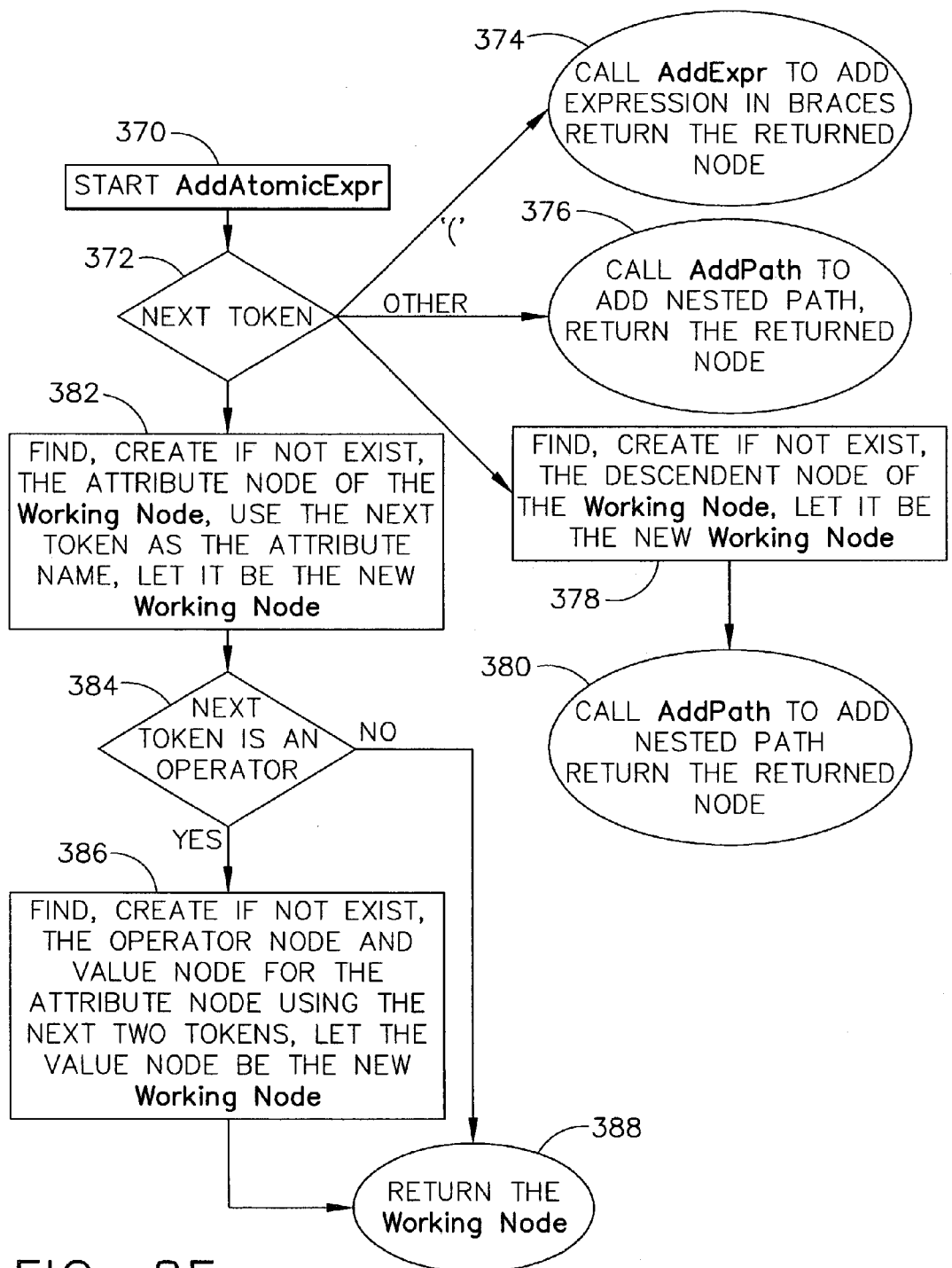

FIG. 8E depicts the procedure AddAtomicExpr. Once the procedure is started 370, the next token is checked 372. If it is '(', call the procedure AddExpr to add expressions in braces and return the node returned by AddExpr 374. If it is './/', find the descendent node (create if not it does not exist) of the working node and let it be the new working node 378, then call the procedure AddPath to add nested path in the atomic expression and return the node returned by AddPath 380. If the token is '@', find (create if it does not exist) the attribute node of the working node with the next token as the name of the attribute, let the attribute node be the new working node 382. Following step 382, the next token is test 384. If it is an operator, find (create if not exist) the operator node and value node using the next two tokens and let the value node be the new working node 386. Finally, return the working node 388. If in step 372, the token is none of '(', './/' and '@', call the procedure AddPath to add nested path and return the node returned by AddPath 376.

In these procedures, Boolean (conjunctive and disjunctive) nodes may be simplified. For example, a Boolean node with a single in-node may be removed by adding the out-nodes of this Boolean node to its in-node; two disjunctive nodes with the same in-nodes can be merged by deleting one of them and adding the out-nodes of the deleted one to the other one.

In order to delete a profile, one may first identify the end node associated with the profile using the hash table mentioned infra, and then may delete the query from the end node. One may also need to delete all "dangling" nodes, i.e., nodes that are no longer useful. The utility of a node may be defined as the total number of its out-edges, plus one if and only if it is an end node of some query (i.e., it records at least one query). Hence, after a profile query is removed from its end node, it is desirable to update its utility. If its utility becomes zero (i.e., it only records the single query to be deleted and does not have an out-edge), one may delete the node, and update the utility for each node with an out-edge leading to it, which may trigger recursive deletion of nodes.

There may be an XML document matching the same query multiple times. For example, <a><e x="3"/><e x="2"/><e x="1"/><e x="0"/><e x="infty"/></a> matches the query /a/e[@x] five times and matcher 34 returns the same ID five times. A simple solution may be to remove duplicate IDs from the result. However, this approach does not eliminate the redundant effort for checking queries that are already matched, and results in poor performance when the number of redundant matches is very large. Alternatively, one can keep an eye on the runtime utility of each node for each document. One can define the applicability of a node as the number of its out-edges that lead to some other nodes whose applicability is greater than zero, plus one if and only if this node is an end node and had not been matched yet. Hence, the applicability of a node is initially its utility since no nodes have been matched yet. When an end node is first matched, one can reduce its applicability by one. If its applicability becomes zero, one can update the applicability of all nodes with out-edges leading to this node. This may be accomplished in a recursive fashion. For conjunctive nodes, their applicabilities are re-initialized each time when their context element instances are changed. Once applicabilities are well maintained for all nodes, redundant matches can be avoided as follows: if a node with zero applicability is matched, drop it immediately without further checking or adding it to the next working node set.

In the above example, assume no other query investigates the element /a/e. The event startElement(e, x="3") triggers the matching of the element node for e and its attribute node for @x. , The query /a/e[@x] is reported and the applicability of this attribute node and this element node will become both zero. For the following four start element events, only the applicability of the element node for e is checked and no further actions are necessary. However, when the index is very large, it may not be efficient to initialize the applicability for each node every time a new XML document comes, since often only a small portion of them are used in the match process. Because of this, a lazy initialization technique can be used.

In this lazy initialization technique, the applicability of a node is initialized only when it is first visited. This can be implemented using a hash table to map each visited node to its applicability. Alternatively, one can assign a document ID to each node together with its applicability. A unique document ID may be maintained for each XML document. When one visits a node, one may compare its document ID with the current document ID to decide whether this is the first visit and initialize the applicability accordingly. The ID may identify a great deal of information, and need not only contain information about the identity of the user, data source, or documents.

To report only the matched portion of the XML document for each matched queries, one can collect the starting and ending positions for each element instance in the XML document and store them together with their IDs on the stack. In addition, the end node of an XPath query needs to indicate node for the matching element of the XPath (e.g., in /a[b], the matching element is "a" instead of the last element "b"). Once an XPath query is matched (its end node is matched), one can identify the matching element node of the query and record the positions of the elements stored in the stack. The user and profile manager may utilize the positions to extract the matching part of the XML document and deliver to the user only that part. Even though the ending position of an element node may not be available at the moment of the match, it can be uniquely identified by the starting position later since each element has a unique starting position and a unique ending position.

Any of the data structures discussed can be efficiently implemented in main memory (RAM). Each conjunctive node has exactly a single context edge, and this may be implemented using a pointer to that context element node. Second, ϵ-edges from the same node may be put in a set implemented by a hash function or tree structure, since one does not need to differentiate them. For each type of other edge, no out-edges from the same node are marked with the same symbols (including * and @*). Therefore, a hash table may be built to map each symbol to the node pointed by the edge.

Figure 9A:
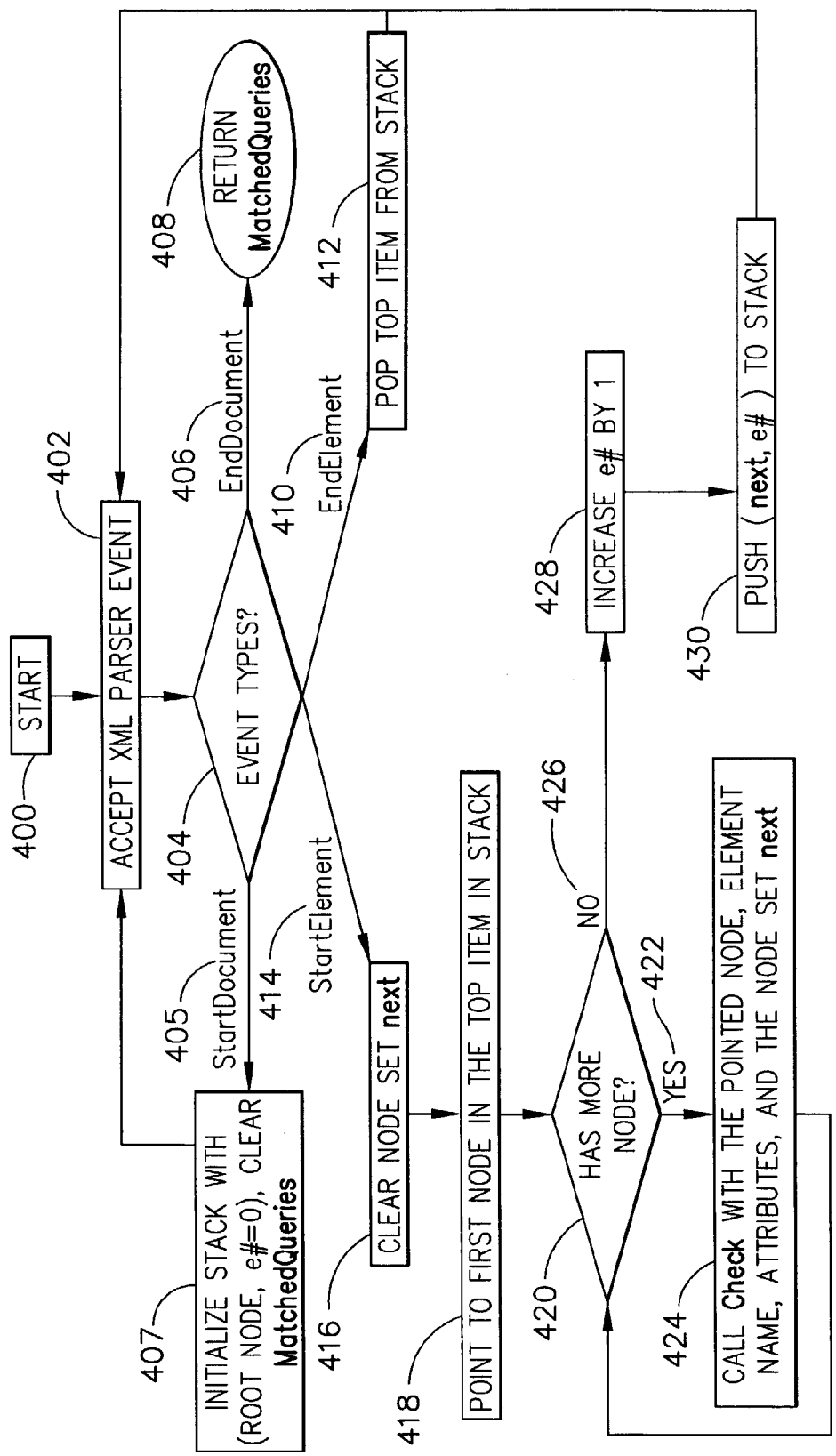
FIGS. 9A, 9B and 9C depict flowcharts for matching XML documents to the indexed profiles according to the present invention.
Figure 9B:
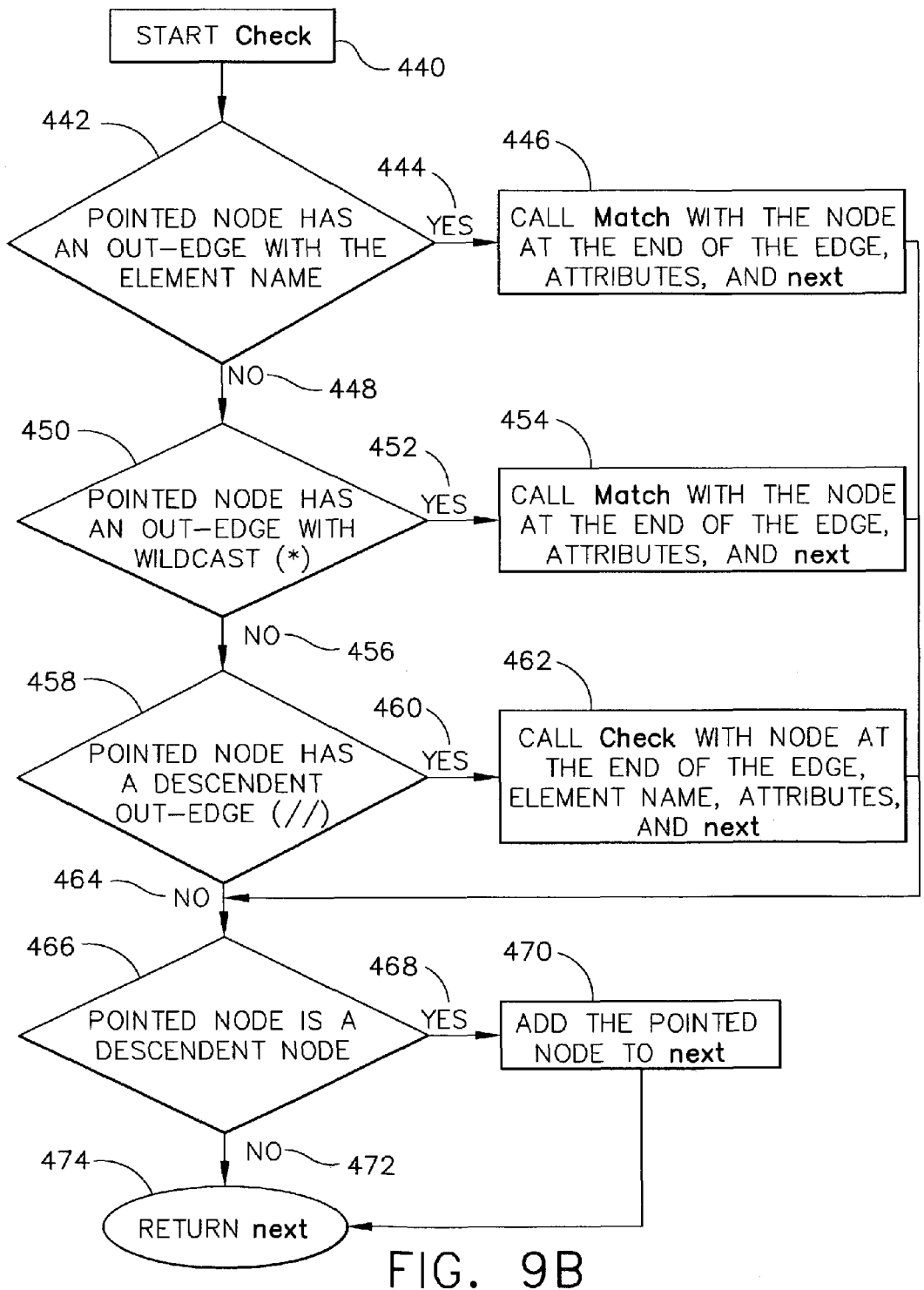
Figure 9C:
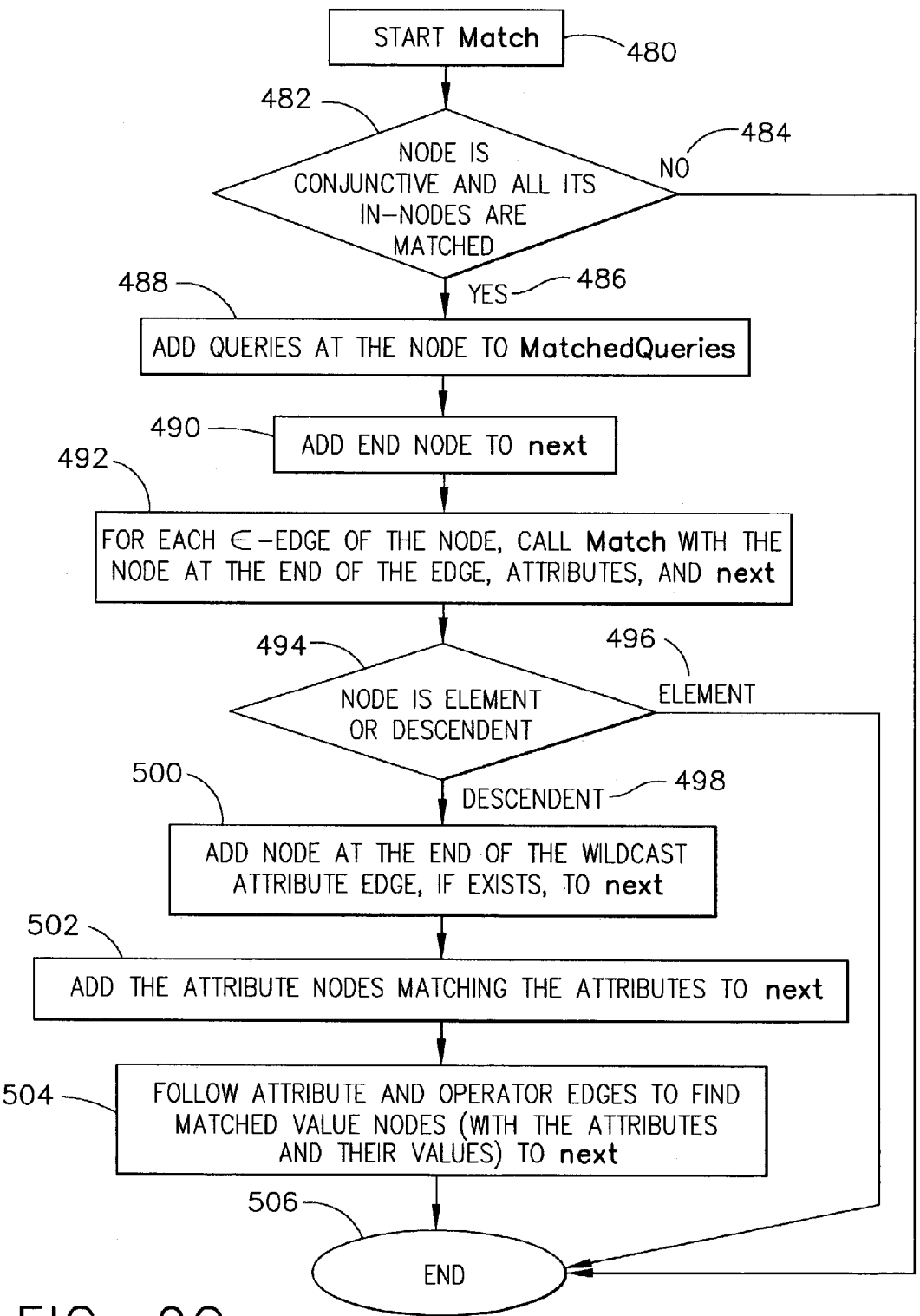

FIGS. 9A, 9B, and 9C depict a matching process according to the present invention. As shown, the first step is a start 400. Next, step 402 comprises accepting an XML parser event. A step 404 determines the event type. If the event type is endDocument 406, proceed to step 408 of returning matched queries. If the event type is EndElement 410, step 412 pops top item from stack occurs, and the process returns to step 402 accepting XML parser event. Where the event type is StartElement 414, step 416 clears node set 'next', then step 418 points to first node in the top item in stack. Next, a step 420 determines if there are more nodes. If yes 422, there are more nodes, step 424 of call 'check' with the pointed node, element name, attributes and the node set 'next' occurs, and the process proceeds back to step 420. If no 426, step 428 e# is increased by 1 and step 430 of pushing (next, e#) to stack occurs, and the process returns to step 402.

FIG. 9B depicts a check process. A first step 440 start check occurs; next step 442 determines if the pointed node has an out-edge with the element name. If yes 444, step 446 of call 'match' with the node at the end of the edge, attributes and next is undertaken. If no 448, proceed to step 450 of determining if the pointed edge has an out-edge with wildcast (*). If yes, 452, step 454 call match with the node at the end of the edge, attributes and next. If no 456, proceed to step 458 of determining if pointed node has a descendant out-edge (//). If yes 460, proceed to step 462 call 'check' with node at the end of the edge, element name, attributes and next. If no 464, proceed to step 466 determining if pointed node is a descendant node. If yes 468, proceed to step 470 add the pointed node to next. If no 472, proceed to return next 474.

FIG. 9C depicts a match process. As shown, a first step 480 is to start match. A next step 482 is to determine if node is conjunctive and all its in-nodes are matched. If yes 484, proceed to step 506 end. If no 486, proceed to step 488, add queries at the node to MatchedQueries. Next, proceed to step 490, add end node to next. Then, proceed to step 492, for each ε-edge of the node, call match with the node at the end of the edge, attributes and next. Proceed to step 494, determining whether node is element or descendant. If node is element 496, proceed to step 506 end. If the node is descendant 498, proceed to step 500, add node at the end of the wildcast attribute edge, if it exists, to next. Next, proceed to step 502, add the attribute nodes matched the attributes to next. Next, proceed to step 504, follow attribute and operator edges to find matched value nodes (with the attributes and their values) to next. Proceed to step 506 end.

It should be understood, of course, that the foregoing relates to preferred embodiments of the invention and that modifications may be made without departing from the spirit and scope of the invention as set forth in the following claims.

We claim:

1. A computer implemented method of delivering digital information in XML format to a user, comprising the following steps:
    inputting a user profile by at least one user into a profile and user manager, wherein said at least one user subscribes to certain information objects with said user profile, and wherein an XPath query specified in said user profile is added to a data structure;
    assigning a unique ID to said user profile which corresponds to said at least one user;
    inserting at least one XML document from a data source into an XML parser;
    accessing said data structure to index said user profile, wherein said data structure includes one root node and one end node for said user profile;
    indexing said user profile according to said data structure;
    parsing said at least one XML document to provide a parsed XML object;
    matching said parsed XML object to said end node to provide a set of matched profiles;
    delivering said set of matched profiles to said profile and user manager;
    notifying said at least one user corresponding to said set of matched profiles; and
    delivering said parsed XML object to said at least one user corresponding to said set of matched profiles.

2. The method as in claim 1, wherein said data structure further comprises at least one intermediate node.

3. The method as in claim 1, wherein said XPath query contains Boolean predicates and nested path.

4. The method as in claim 1, further comprising the step of deleting said user profile.

5. The method as in claim 1, wherein said end node is selected from the group consisting of element node, conjunctive node, disjunctive node, operator node, and value node.

6. The method as in claim 2, wherein said intermediate node is selected from the group consisting of element node, conjunctive node, disjunctive node, operator node, and value node.

7. The method as in claim 1, further comprising the step of extracting a matched portion of an XML document for a matched profile.

8. The method as in claim 1, further comprising the step of inputting said unique ID into a hash table, wherein said hash table maps at least one profile ID to one end node within an index.

9. The method as in claim 1, wherein said node may be connected by edges between two nodes, wherein said two nodes are selected from the group consisting of root nodes, end nodes, and intermediate nodes, and wherein each said edge contains one symbol.

10. The method as in claim 9, wherein said symbol is selected from the group consisting of element name, wildcast, attribute name, operator, and constant.

11. The method as in claim 9, further comprising the step of compiling said symbols into internal representation.

12. The method as in claim 1, further comprising the step of deleting a duplicate matched profile from said set of matched profiles.

13. The method as in claim 1, further comprising the step of deleting a dangling node included in said data structure.

14. A computer implemented method of delivering digital information in XML format to a user, comprising the following steps:
    inputting a user profile by at least one user into a profile and user manager and adding information specified in said user profile to a data structure;
    assigning a unique ID to said user profile which corresponds to said at least one user;
    inserting at least one XML document from a data source into an XML parser;
    providing a matcher to receive at least one event from said XML parser and said profile and user manager;
    accessing said data structure to index said user profile, wherein an index includes one root node and one end node for said user profile;
    indexing said user profile according to said data structure;
    parsing said at least one XML document such as to provide at least one parsed XML object;
    matching said at least one parsed XML object to profiles indexed within said index to provide a set of matched profiles and a set of matched end nodes;
    delivering said set of matched profiles to said profile and user manager;
    determining at least one matched profile ID, according to a matched end node;

notifying said at least one user who corresponds to said unique ID associated with said at least one matched profile ID;

delivering said at least one parsed XML document to said at least one user who corresponds to said unique ID associated with said at least one matched profile ID;

removing at least one duplicate matched profile when there is at least one duplicate matched profile corresponding to said matched end node;

deleting said at least one duplicate matched profile from said matched end node; and storing information regarding said user profile and said matched end node into a hash table.

15. The method as in claim 14, wherein said data structure further comprises at least one intermediate node.

16. The method as in claim 14, wherein said matched end node is selected from the group consisting of element node, conjunctive node, disjunctive node, attribute node, operator node, and value node.

17. The method as in claim 15, wherein said at least one intermediate node is selected from the group consisting of element node, conjunctive node, disjunctive node, attribute node, operator node, and value node.

18. The method as in claim 14, further comprising matching XML documents against XPath queries with at least a nested path.

19. A computer implemented method of delivering digital information in XML format to a user, comprising the following steps:

inputting a user profile by at least one user into a profile and user manager;

inserting at least one XML document from a data source into an XML parser, wherein said step of inserting at least one XML document into an XML parser is a start event;

initializing an auxiliary stack having at least one stack item, wherein said at least one stack item records a match state comprised of at least one node and at most one element, and wherein initially the auxiliary stack only contains a single item with a single node and a root node;

receiving at least one start element event from the XML parser and assigning a unique ID for said at least one start element;

checking all out-edges for said at least one node led by said out-edges that matches a name or an attribute of said at least one start element;

pushing said at least one node and said at least one start element to said auxiliary stack;

reaching and collecting at least one matched end node;

receiving an end event and sending matched profile IDs marked on said at least one matched end node;

locating at least a portion of said XML document based upon said matched profile IDs;

removing at least one duplicate matched profile ID when there is more than one of the same matched profile IDs; and delivering at least a portion of said XML document to said at least one user.

20. The method as in claim 19, further comprising a step of deleting said user profile.

21. The method as in claim 19, further comprising a step of avoiding redundant matches of the XML document to said user profile.

22. A computer implemented XML based publish subscribe system, comprising:

at least one data source, wherein said at least one data source inputs at least one new XML document into an XML parser;

an index, wherein said index indexes at least one user profile;

a matcher, wherein said matcher provides matched profiles that correspond to at least a portion of said at least one new XML document;

a locator, wherein said locator locates user profiles indexed for deletion;

a profile parser, wherein said profile parser analyzes a XPath query included in said user profile and encodes said XPath query into efficient internal representation for said index; and a profile and user manager, wherein said profile and user manager accepts a profile information from at least one user, utilizes said profile parser to parse said at least one user profile and to send said at least one user profile to said index, utilizes said locator to identify profiles for deletion from the index upon a user request, receives said matched profiles from said matcher, and publishes at least one object to said at least one user according to said profile information.

23. The system as in claim 22, wherein said index is further comprised of one root node and one end node for said at least one user profile.

24. The system as in claim 23, wherein said index is further comprised of at least one intermediate node.

25. The system as in claim 23, wherein said end node is selected from the group consisting of element node, conjunctive node, disjunctive node, attribute node, operator node, and value node.

26. A system as in claim 24, wherein said at least one intermediate node is selected from the group consisting of element node, conjunctive node, disjunctive node, attribute node, operator node, and value node.

27. The system as in claim 22, wherein said at least one user profile includes an XPath query which contains Boolean predictions and nested paths.

28. The system as in claim 22, further comprising a hash table, wherein said hash table maps said at least one user profile within said index.

29. The system as in claim 24, further comprising at least one symbol, wherein said at least one symbol is along an edge of one of said root node, said end node, and said intermediate node.

30. The system as in claim 29, wherein said symbol is selected from the group consisting of element name, wildcast, attribute name, operator, and constant.

31. A computer implemented XML based publish subscribe system for updating and delivering information comprising:

at least one user, wherein said at least one user subscribes to said system;

at least one data source, wherein said at least one data source inputs at least one new XML document into an XML parser;

an index, wherein said index indexes at least one query having at least one intermediate node, and wherein said at least one query has one root node and one end node;

a symbol along an edge connecting two nodes selected from the group consisting of said one root node, said one end node, and said at least one intermediate node;

a matcher, wherein said matcher provides a matched profile that correspond to at least a portion of said at least one new XML document;

a locator, wherein said locator locates user profiles indexed for deletion;

a profile parser, wherein said profile parser analyzes a XPath query included in said user profile and encodes said XPath query into efficient internal representation for said index;

a hash table, wherein said hash table maps at least one user profile within said index; and a profile and user manager, wherein said profile and user manager accepts a profile information from said at least one user, utilizes said profile parser to parse said at least one user profile and to send said at least one user profile to said index, utilizes said locator to identify profiles for deletion from the index upon a user request, receives said matched profile from said matcher, and publishes at least one object to said at least one user according to said profile information.

32. The system as in claim 31, wherein said one end node is selected from the group consisting of element node, conjunctive node, disjunctive node, attribute node, operator node, and value node.

33. The system as in claim 31, wherein said at least one intermediate node is selected from the group consisting of element node, conjunctive node, disjunctive node, attribute node, operator node, and value node.

34. The system as in claim 31, wherein said at least one user profile includes an XPath query which contains at least one Boolean prediction and at least one nested path.

35. The system as in claim 31, wherein said symbol is selected from the group consisting of element name, wildcast, attribute name, operator, and constant.

* * * * *